United States Patent

Gwinn

[15] 3,689,595

[45] Sept. 5, 1972

[54] HIGH IMPACT POLYPROPYLENES
[72] Inventor: J. S. Gwinn, Bartlesville, Okla.
[73] Assignee: Phillips Petroleum Company
[22] Filed: April 28, 1970
[21] Appl. No.: 32,734

[52] U.S. Cl. ..........260/876 B, 260/23.7 R, 260/827, 260/836, 260/878 B, 260/880 B
[51] Int. Cl. ......................C08f 29/12, C08f 33/08
[58] Field of Search ...............................260/876 B

[56] References Cited

UNITED STATES PATENTS

| | | |
|---|---|---|
| 3,299,174 | 1/1967 | Kuhre et al............260/876 B |
| 3,424,649 | 1/1969 | Nyberg et al..........260/876 B |
| 3,526,606 | 9/1970 | Minekawa et al.....260/876 B |
| 3,534,965 | 10/1970 | Harrison et al.........260/876 B |
| 3,281,383 | 10/1966 | Zelinski et al..........260/880 B |
| 3,358,056 | 12/1967 | Renaudo................260/878 B |
| 3,262,992 | 7/1966 | Holzer et al............260/876 B |
| 3,506,740 | 4/1970 | Dempsey et al........260/876 B |
| 3,294,868 | 12/1966 | Pritchard...............260/876 B |
| 3,414,637 | 12/1968 | Jones et al.............260/876 B |

*Primary Examiner*—Samuel H. Blech
*Attorney*—Young and Quigg

[57] ABSTRACT

A high impact polypropylene having an improved low brittleness temperature and an increased Izod impact strength is produced by blending together (1) a mixed copolymer, produced by first forming blocks of propylene homopolymer in presence of which there is then polymerized unreacted propylene and added ethylene by continuing the polymerization reaction thus resulting in said mixed copolymer with (2) a resinous radial block copolymer obtained by sequentially polymerizing a monovinyl-substituted aromatic hydrocarbon and a conjugated diene, and subsequently treating polymer thus obtained with a polyfunctional treating agent to obtain said copolymer which is radial with respect to long branches which radiate from a nucleus formed by the polyfunctional compound. The mixed copolymer can be produced by either batch or continuous operation. When produced by continuous operation, it is improved as a high-impact resin by addition of the radial copolymer, which lowers brittleness temperature and increases Izod impact. The batch produced mixed copolymer, the properties of which are already attractive can be further improved with respect to reduction of brittleness temperature and increase of Izod impact by adding thereto the radial resin. An increase in flexural modulus of the mixed copolymer, for example, as produced by continuous operation, can be obtained by blending it with polypropylene as produced by a usual method. Mixed copolymer is also blended with the radial copolymer and with polypropylene to obtain an improved high impact polypropylene polymer. The radial block copolymer can also be polymodal.

11 Claims, No Drawings

3,689,595

HIGH IMPACT POLYPROPYLENES

This invention relates to a polypropylene having improved properties, e.g., high impact strength and low brittleness temperature.

General

In one of its aspects the invention relates to the blending of a polypropylene having a high impact strength with at least one material specified herein to yield a blended composition having improved properties, e.g., low brittleness temperature. In another of its aspects the invention relates to such composition. Further, in another of its aspects, the invention relates to a polypropylene of increased flexural modulus.

Concepts

According to one of its concepts the present invention provides a method for improving the properties of a high impact polypropylene, produced by first forming blocks of propylene polymer followed by continued polymerization in presence thereof of unreacted propylene and added ethylene resulting in a mixed copolymer, for example, as produced either by a continuous process or batch operation, by blending therewith a resinous radial block copolymer, e.g., a resinous radial block copolymer produced by polymerizing, say, sequentially, a monovinyl-substituted aromatic hydrocarbon and a conjugated diene, the ultimate radial resin being obtained upon treating the final copolymer thus obtained with a polyfunctional treating agent. The resinous radial block copolymer used in the blend will be polymodal with respect to molecular weight distribution when incremental addition of initiator and monovinyl-substituted aromatic monomer during the step of polymerizing said aromatic monomer is employed. When substantially all of the said aromatic monomer is initially charged and is therefore essentially polymerized in a one-batch operation the resinous, radial block copolymer will not be polymodal.

According to another concept of the invention it provides a composition having improved properties, e.g., high Izod impact strength and a low brittleness temperature, by blending with a mixed propylene-ethylene copolymer, a small proportion of a resinous radial block copolymer.

Further, still, according to a concept of the invention it provides a method for improving the properties of a mixed propylene-ethylene copolymer by adding thereto, as by blending, both a resinous radial block copolymer and a polypropylene which can be produced by a usual method.

It has now been discovered by me that blending of a mixed copolymer, produced as herein described, with a radial copolymer, produced also as herein described, will materially improve its properties, for example, Izod impact strength and brittleness temperature. Further, the addition of polypropylene to the blend will serve to at least retain, if not actually to increase its flexural modulus. When both the radial resin and polypropylene are blended with the mixed copolymer, as herein described, it will have at least improved Izod impact strength and low brittleness temperature with at least no significant reduction in the original mixed copolymer flexural modulus.

An object of the invention is to provide a high impact polypropylene. Another object of the invention is to provide a method for producing a high impact polypropylene. A further object of the invention is to produce a high impact polypropylene having improved properties, e.g., high Izod impact strength and low brittleness temperature. A further object of the invention is to provide a high impact polypropylene having desirable increased flexural modulus.

Other aspects, concepts, and objects of the invention as well as its several advantages are apparent from this description and the appended claims.

Statements of Invention

According to the present invention a mixed propylene-ethylene copolymer is blended or intimately brought together with a minor proportion of a resinous radial block copolymer to produce an improved mixed propylene-ethylene copolymer, e.g., a polymer having high Izod impact strength and low brittleness temperature.

Further according to the invention a mixed propylene-ethylene copolymer, a minor proportion of resinous radial block copolymer and a minor proportion of polypropylene, the proportions being based on said mixed copolymer, are blended together to yield a composite or composition which has a desirable flexural modulus, for example, one which has at least substantially the same flexural modulus which is possessed by the original mixed copolymer.

Still according to the invention the mixed propylene-ethylene copolymer, resinous radial block copolymer and polypropylene can be blended together to produce a composition having high Izod impact strength and a low brittleness temperature and a flexural modulus which is acceptable. The final blends usually will contain at least about 65 weight percent of the mixed propylene-ethylene copolymer, the remainder being essentially the resinous, radial block copolymer and, when it is present, polypropylene with the radial copolymer content not less than about 2 percent of the final blend. More specifically, the final blend contains at least 70 weight percent of the mixed copolymer, the remainder being the radial resin copolymer and polypropylene with the radial resin content of the final blend being at least about 5 and up to about 10 percent.

PREPARATION OF MIXED COPOLYMER

A preparation of a high impact polypropylene or mixed propylene-ethylene copolymer is described and claimed in U. S. Pat. No. 3,358,056, issued Dec. 12, 1967, Samuel Renaudo. The patent, the entire disclosure of which is incorporated herein by reference, describes a two-step polymerization process comprising a step in which propylene as the sole monomer is polymerized in the presence of liquid propylene in the absence of additional liquid diluent at a temperature within the range of 80° to 150° F. and a step in which ethylene is polymerized in the presence of liquid propylene in the absence of additional liquid diluent at a temperature within the range of −50° to 75° F., the step which is carried out second being performed in the presence of the polymer produced in the first, using a catalyst formed by mixing materials comprising a. a compound having the formula $R_nMX_m$, wherein R is selected from the group consisting of alkyl, cycloalkyl and aryl radicals, X is selected from the group consisting of hydrogen and a halogen, M is selected from the group consisting of aluminum, gallium, indium and thallium, n is from 1 to 3, inclusive, m is from 0 to 2, inclusive, and the sum of m and n is equal to the valence of the metal M, and b. a halide of a metal selected from the group consisting of metals of Groups IV–A, IV–B, V–B, VI–B, and VIII.

It also describes a polymerization process comprising polymerizing ethylene in the presence of liquid propylene in the absence of additional liquid diluent at a temperature within the range of $-50°$ to $75°$ F., using a catalyst formed by mixing materials comprising a. a compound having the formula $R_nMX_m$, wherein R is selected from the group consisting of alkyl, cycloalkyl and aryl radicals, X is selected from the group consisting of hydrogen and a halogen, M is selected from the group consisting of aluminum, gallium, indium and thallium, n is from 1 to 3, inclusive, m is from 0 to 2, inclusive, and the sum of m and n is equal to the valence of the metal M, and b. a halide of a metal selected from the group consisting of metal of Groups IV–A, IV–B, V–B, VI–B, and VIII removing unpolymerized ethylene from the reaction mixture, and polymerizing in the presence of liquid propylene at least a portion of the remaining propylene at a temperature within the range of $80°$ to $150°$ F. in the presence of the polymer produced in the first step.

Thus, in the patent there is described the preparation of a copolymer of ethylene and propylene by a two-step process. In one step the slower reacting monomer, propylene, is polymerized at a relatively high temperature in the presence of liquid propylene as the sole diluent so as to produce a propylene block at commercially acceptable rates. In the other step ethylene is polymerized at a relatively low temperature, again the presence of liquid propylene as the sole diluent. Because of this low temperature the block produced in this step is predominantly of ethylene. These steps may be carried out in any order; that is, the high temperature polymerization of the propylene may be either first or second.

The patent states that it is known to prepare an ethylene-propylene block copolymer having high crystallinity, impact strength, modulus, and tensile and low brittleness temperature by polymerizing one monomer, removing any unpolymerized material suspending the polymer in a hydrocarbon solvent such as n-heptane; and polymerizing a second monomer block onto the first polymer block, and that the invention thereof constitutes an improvement over the combination process described above because no extraneous diluents are required. By proper temperature selection it is possible to carry out both steps of the polymerization using liquid propylene as the reaction medium while still obtaining good reaction rates. The use of a comparatively low temperature for the polymerization of the ethylene in the presence of liquid propylene is necessary for a high ethylene content. The polymerization of the ethylene in presence of the propylene is preferably effected at $-50°$ to $75°$ F. Especially good results are obtained below $10°$ F. Higher temperatures, as high as generally $80°$ to $150°$ F., are used for the homopolymerization of the propylene.

It will be noted from the foregoing that either the propylene or the propylene-ethylene mixture can be first polymerized in the patented process for producing the mixed propylene-ethylene copolymer.

Among the catalyst systems which can be employed in the patented process are those which are capable of polymerizing a mono-1-olefin in a mass polymerization system and under conditions such that solid polymer in particle form is produced. Catalyst systems suitable for use can be broadly defined as comprising an organometal compound and a metal salt. A particularly suitable catalyst is one which comprises a. a compound having the formula $R_nMX_m$, wherein R is an alkyl, cycloalkyl or aryl radical or combinations of these radicals, such as alkaryl, aralkyl and alkylcycloalkyl, X is hydrogen or a halogen, including chlorine, bromine, iodine and fluorine, M is aluminum, gallium, indium or thallium, n is from 1 to 3, inclusive, m is from 0 to 2, inclusive, and the sum of m and n is equal to the valence of the metal M, and b. a halide of a metal of Group IV–A, IV–B, V–B, VI–B, or VIII.

The hydrocarbon radicals which can be substituted for R in the aforementioned formula include radicals having up to about 20 carbon atoms each. Radicals having 10 carbon atoms or less are preferred since the resulting catalyst composition has a greater activity for initiating the polymerization.

Examples of compounds corresponding to the formula $R_nMX_m$ which can be employed include trimethylaluminum,
triethylaluminum,
triisobutylaluminum,
tri-n-butylaluminum,
tri-n-pentylaluminum,
triisooctylaluminum,
tri-n-dodecylaluminum,
triphenylaluminum,
triethylgallium,
triphenylgallium,
tricyclohexylgallium,
tri-n-butylindium,
triethylthallium,
diethylaluminum hydride,
$CH_3AlCl_2$,
$(CH_3)_2AlCl$,
$C_2H_5AlCl_2$,
$(C_2H_5)_2AlCl$,
$(C_4H_9)_2AlBr$,
$C_8H_{17}AlI_2$,
$(C_3H_7)_2GaF$,
$(C_6H_{11})_2GaCl$ (cyclohexane derivative),
$(C_6H_5)GaBr_2$ (benzene derivative),
$C_{20}H_{41}GaBr_2$,
$(C_{14}H_{29})_2GaF$,
$(C_6H_5)_2InCl$ (benzene derivative)
$C_8H_{17}InF_2$,
$(C_6H_{11})InBr_2$ (cyclohexane derivative)
3-methylcyclohexylaluminum dichloride,
2-cyclohexylethylgallium dichloride,
p-tolylberyllium iodide,
di-(3-phenyl-1-methylpropyl) indium fluoride,
2-(3-isopropylcyclohexyl)ethylthallium dibromide,
and the like.

Mixtures of these materials, such as a mixture of diethylaluminum chloride and ethylaluminum dichloride, etc., can also be employed.

The metal halide component of the catalyst system is preferably a halide of a Group IV–A or IV–B metal, i.e., titanium, zirconium, hafnium and germanium. The trichlorides, trifluorides, tribromides and triiodides as well as the tetrachloride, tetrafluorides, tetrabromides and tetraiodides of the Group IV–A or IV–B metals, can be used in the catalyst system, either individually or as mixtures of two or more of the metal halides. It is usually preferred to employ a trichloride, such as titanium trichloride, in the polymerization. However, it is to be understood that halides of metals of the other groups specified above, such as vanadium, molybdenum, tungsten, cobalt, and iron can also be employed in the catalyst system.

The preferred catalyst system employed in the polymerization in the patent comprises a dialkylaluminum chloride, such as diethylaluminum chloride, and titanium trichloride, the latter compound preferably being prepared by reduction of titanium tetrachloride in the presence of aluminum. The reduction product is preferably a complex having the approximate formula $3TiCl_3 \cdot AlCl_3$. The reduction reaction is usually carried out at an elevated temperature, for example, at a temperature in the range of 360° to 600° F., preferably from 375° to 450° F.

The amount of catalyst employed in the polymerization can vary over a rather wide range and will depend at least to a certain degree upon the particular catalyst system utilized. However, the determination of the actual amount of the catalyst employed in any particular polymerization is well within the skill of the art. In general, the mol ratio of the organometal compound to the metal salt falls within the range of 0.02 to 50 mols/mol. When employing the preferred catalyst system, the mol ratio of the dialkylaluminum halide to the titanium trichloride complex usually ranges from 1.0:0.02 to 1.0:50.0, preferably 1.0:0.1 to 1.0:10.0. The amount of dialkylaluminum halide used is at least $1.0 \times 10^{-4}$ gm./gm. of monomer and can be as much as $25 \times 10^{-4}$ gm./gm. of monomer. The amount of titanium trichloride employed is generally in the range of $1.5 \times 10^{-4}$ to $10 \times 10^{-4}$ gm./gm. of monomer.

Although not essential to the conduct of the polymerization of the patent, it is often desirable to carry out the polymerization in the presence of elemental hydrogen. When so operating, hydrogen is added in an amount sufficient to provide from 0.03 to 1.0 mol per cent hydrogen in the liquid mono-1-olefin phase in the polymerization zone.

Although pressures ranging from atmospheric up to 5,000 psig can be used, a pressure in the range of 100 to 1,000 psig is ordinarily preferred. In general, the pressure used in the process is sufficient to maintain the reaction mixture substantially in the liquid phase.

The lower temperature used when ethylene is polymerized in the second step of the polymerization can be obtained by external heat exchange or by auto refrigeration, i.e., by flashing propylene from the first reaction mixture. A combination of these cooling methods can be used.

Several reactors can be used in either or both stages.

Although the ethylene can be added to reaction zone, in either liquid or gas phase, it is preferable in some instances to add to it in liquid phase.

Infrared spectra of the resin of the patent indicate that the copolymer phase contains methylene sequences of at least five or more units. There are two bands present at 13.70 and 13.88 microns, the former being a shoulder on the latter. The 13.70 micron band disappears when the sample is melted indicating that a crystalline polyethylene structure is present.

The proportion of the polypropylene in the mixed copolymer generally constitutes 90–40 percent, preferably 85–75 percent by weight of the final product.

The mixed copolymers which are included herein as being polymers which can be improved significantly by a method of the invention are those which contain at least 75 weight percent of polypropylene obtained by homopolymerization of propylene, from about 10 to about 25 weight percent of propylene-ethylene copolymer obtained by copolymerization of an ethylene-propylene mixture, the total mixed copolymer containing from 5 to 15 weight percent ethylene with the remainder being propylene. The brittleness temperatures of such mixed copolymers usually will be in the approximate range 0° to –50° F., depending on method of preparation and the copolymer content.

The improvement which can be obtained according to the invention will range from about 10° to about 50° F. lowering of the brittleness temperature. Izod impact will also be significantly increased. Flexural modulus of the mixed copolymer can be increased by use of polypropylene, as described, while the modulus of the mixed copolymer — radial resin — polypropylene blend will compare vary favorably with that of the mixed copolymer used.

One skilled in the art in possession of this disclosure and the art to which it pertains will understand that some variation and modification are possible and that in each instance the specific conditions, ratios, etc., can be determined by routine test to obtain results according to the invention.

A continuous preparation of mixed copolymer is described and claimed in Ser. No. 818,709, filed Apr. 23, 1969, Jack S. Scoggin. According to the application, the entire disclosure of which is incorporated herein by reference, there is provided a process for producing a solid mixed homo- and copolymer which comprises mass homopolymerizing a first monomer and then mass copolymerizing the polymer thus obtained with additional first and a second monomer, recovering and washing solid thus produced with an impure fraction of the monomers so reacted, the fraction being obtained by a fractionation of unreacted excess monomers to produce a stream containing catalyst and any soluble polymer, a stream containing a mixture of the monomers, using a portion of the stream of monomers as said impure fraction, fractionating another portion thereof to obtain one of the monomers for the homopolymerization and a mixture of the monomers for said copolymerization. Further, there is provided a process for the production of a solid mixed propylene-ethylene polymer which comprises in a homopolymerization zone homopolymerizing, in liquid phase under homopolymerizing conditions and with a suitable catalyst, propylene in the substantial absence of ethylene, then, in a copolymerization zone under copolymerizing conditions and with a suitable catalyst, copolymerizing in liquid phase ethylene and propylene with homopolymer produced in said homopolymerization zone, recovering from said copolymerization zone a solid polymeric mass containing a mixed ethylene-propylene copolymer, containing a portion composed substantially only of polypropylene and a portion of ethylene-propylene copolymer, separating said solid polymeric mass from liquid phase, unreacted ethylene, propylene, catalyst and any liquid-phase soluble polymer by washing the same with an impure liquid propylene-containing liquid stream also containing ethylene, recovering said solid polymeric mass, passing the thus used impure liquid propylene liquid stream to a first fractionation zone, therein separating from the hydrocarbons as a bottoms stream, catalyst and soluble polymer, and as an overhead, a stream containing hydrocarbons, including ethylene and propylene, using a portion of said overhead as said impure liquid propylene-containing liquid stream for washing said solid polymeric mass, passing another portion of said overhead to a second fractionation zone, therein separating a first substantially ethylene-free propylene stream and second stream containing ethylene and propylene, passing said first stream to said homopolymerization zone and passing said second stream to said copolymerization zone.

Generally, catalyst and conditions of polymerization which can be used are substantially the same as in the patent to which reference has been made above. One skilled in the art will select from that art the catalyst and conditions, ratios, etc. best suited to his purposes as this can be done by routine testing. The ratios of propylene to ethylene or to propylene-ethylene copolymer will be as stated herein.

The invention is applicable to any mixed copolymer prepared as herein described.

PREPARATION OF RADIAL RESINOUS COPOLYMERS

In Ser. No. 859,861, filed Sept. 22, 1969, by Alonzo G. Kitchen and Frank J. Szalla, now U.S. Pat. No. 3,639,517, issued Feb. 1, 1972, (Phillips Petroleum Company). entitled "Resinous Branched Block Copolymer," the entire disclosure of which is incorporated herein by reference, there is described and claimed a resinous polymer comprising from about 70 to 95 weight percent polymerized monovinyl-substituted aromatic hydrocarbon monomer containing from about eight to 18 carbon atoms per molecule and from about 30 to 5 weight percent polymerized conjugated diene monomer containing from about four to 12 carbon atoms per molecule; said polymer having a melt flow in the range of about 0.5 to 20.0 as determined by ASTM D–1238–65T, condition G; said polymer being a branched block copolymer; said polymer demonstrating a plurality of modes on a gel permeation chromatograph curve of said polymer when determined according to the procedure of Example IV of this specification; said polymer when formed into articles demonstrating a haze transmittance in the range of about 0 to 20 percent as determined by ASTM D–1003–61, Procedure A, a falling ball impact strength value in ft/lbs of at least 1.0 when determined according to the procedure of Example I, footnote 7, of the specification, and environmental stress cracking resistance value in days of at least 100 days at zero percent failure when determined according to the procedure of Example II of the specification. There is also described and claimed a polymerization process for preparing branched block copolymers comprising the sequential steps;

a. contacting under polymerization conditions at a temperature up to about 250° F. a monovinyl-substituted aromatic hydrocarbon monomer containing from about eight to 18 carbon atoms per molecule with an organolithium polymerization initiator containing from about one to 20 carbon atoms per molecule wherein said monovinyl-substituted aromatic hydrocarbon monomer is employed in an amount to provide from about 40 to 90 weight percent of the total monovinyl-substituted aromatic hydrocarbon employed in preparing said copolymer wherein said initiator is employed in an amount to provide from about 0.01 to 0.2 parts by weight of initiator per 100 parts by weight of said monomer and continuing said contacting for a period of time sufficient to polymerize essentially all of said monovinyl-substituted aromatic hydrocarbon monomer;

b. charging to the polymerization reaction product of step (a), in one or more increments, the remaining monovinyl-substituted aromatic hydrocarbon monomer representing from about 10 to 60 weight percent of said total monovinyl-substituted aromatic hydrocarbon monomer employed in preparing said copolymer, wherein for each incremental charge of monovinyl-substituted aromatic hydrocarbon monomer additional said organolithium initiator is provided in an amount from about 0.1 to 1.5 parts by weight of said initiator per 100 parts by weight of said incremental charge of monomer, wherein after each monomer and initiator charged a sufficient contacting time is allowed to permit essential complete polymerization of the newly added monomer, wherein the amount of initiator employed per 100 parts by weight of each incremental monomer charge of step (b) exceeds the amount of initiator employed in step (a) by at least 0.1 part of initiator per 100 parts of monomer by weight and wherein the total amount of said monovinyl-substituted aromatic hydrocarbon monomer employed in steps (a) and (b) comprises from about 70 to 95 weight percent of the total weight of said branched block copolymer based upon the total weight of all of the monomers employed;

c. charging to the polymerization reaction product of step (b) a conjugated diene monomer containing from about four to 12 carbon atoms per molecule and polymerizing to essential completion said diene monomer in the presence of said reaction product to form a block copolymer, and wherein the amount of said diene monomer comprises from about 30 to 5 weight percent of the total weight of said branched block copolymer based upon the total weight of all of the monomers employed; and d. charging to the polymerization reaction product of step (c) a polyfunctional treating agent capable of reacting with terminal lithium atoms on a preformed polymer to form a branched polymer wherein said polyfunctional treating agent is employed in an amount to provide from about 0.05 to 2 equivalents of said polyfunctional treating agent per gram atom of lithium employed in said polymerization process.

The polymers prepared according to the invention of said application Ser. No. 859,861, filed Sept. 22, 1969, are polymodal, resinous, branched block copolymers and contain from about 70 to 95 weight percent of polymerized monovinyl-substituted aromatic hydrocarbon monomer based on the weight of the total monomers employed. The polymers of the application when formed into articles not only exhibit surprising and outstanding properties such as impact strength and high environmental stress cracking resistance but are transparent as well. The polymers also exhibit remarkable processability and can be employed in conventional processing equipment with ease.

The polymers of the application are prepared by a novel polymerization process employing the sequential polymerization of monovinyl-substituted aromatic hydrocarbon and conjugated dienes. Nonelastomeric blocks or segments are first formed by multiple additions of monovinyl-substituted aromatic hydrocarbon monomer and organolithium initiator. Subsequently, the conjugated diene is added and polymerized to form an elastomeric polymer block followed by the addition of a polyfunctional treating agent. The multiple addition or charging of the monovinyl-substituted aromatic hydrocarbon monomer and the organolithium initiator must be made at particularly described concentrations.

Specifically, in the polymerization process, nonelastomeric (resinous) blocks of polymer must be first formed. The resinous portion of the block copolymer is formed by charging a substantial portion of the total amount of monovinyl-substituted aromatic hydrocarbon monomer employed to a polymerization vessel and contacting said monomer with a relatively small amount of organolithium initiator and maintaining polymerization conditions for a period of time sufficient to convert essentially all of the monomer and the initiator to relatively long nonelastomeric chains of living polymer having active terminal lithium atoms.

The remainder of the total monovinyl-substituted aromatic hydrocarbon monomer employed is then charged in one or more increments, to said polymerization vessel containing the polymerization reaction product of the first charge such that each incremental charge of monomer is accompanied by a corresponding incremental charge of initiator so that a relatively large amount of initiator is employed per amount of monomer. The polymerization conditions are maintained and after each incremental charge of monomer and initiator a sufficient time is allowed to convert essentially all of the newly added monomer and initiator to nonelastomeric chains of living polymer.

In another embodiment, substantially all of the monovinyl-substituted aromatic hydrocarbon monomer and substantially all of the initiator are charged to the polymerization reactor. All of the monomer is thus polymerized in one step. Such a polymer is not polymodal as when prepared by the previously described incremental addition and polymerization but has similar properties.

It is within the scope of the invention to have some of each of the polymodal and nonpolymodal polymer in the ultimate composition.

After the nonelastomer polymer fraction has been prepared, the chains of nonelastomeric living polymer are contacted with conjugated diene monomer which is charged to the polymerization vessel and the reaction mixture is allowed to polymerize again to essential completion to form chains of living copolymer containing both elastomeric and nonelastomeric blocks.

The polyfunctional treating agent is then added to the polymerization mixture under reaction conditions sufficient to form branched copolymers containing both the elastomeric and nonelastomeric blocks. Thus, the poly-functional treating agent is added to the polymerization mixture after the polymerization has been essentially completed but prior to deactivation of the polymerization initiator.

The polymer can be recovered after the polyfunctional treating agent has formed the branched block copolymers. Recovery of the polymers can be by conventional methods used for recovering polymer from organometal polymerization mixtures such as by treatment with materials containing active hydrogen such as alcohols, aqueous acids, and the like.

In the first addition step the monovinyl-substituted aromatic hydrocarbon is added in an amount to provide from about 40–90 weight percent, preferably at least 60 weight percent of the total monovinyl-substituted aromatic hydrocarbon employed in the total copolymer composition. An organolithium initiator is employed with said first addition step in an amount to provide from about 0.01 to 0.2 parts by weight per 100 parts by weight of monomer employed in said first addition. This first charge of monovinyl-substituted aromatic hydrocarbon, representing about 40–90 weight percent of the total monovinyl-substituted aromatic hydrocarbon monomer employed in preparing the block copolymer, is then allowed to polymerize to essential completion.

The remaining monovinyl-substituted aromatic hydrocarbon monomer, i.e., from about ten to 60, preferably less than 40, weight percent of the total monovinyl-substituted aromatic hydrocarbon employed, is charged, in one or more increments, to this reaction mixture. For each incremental charge of monomer there is another charge of organolithium polymerization initiator. The polymerization initiator is preferably charged to said reaction mixture prior to charging said remaining monovinyl-substituted aromatic hydrocarbon monomer. From about 0.1 to about 1.5 parts of organolithium polymerization initiator per 100 parts of monomer employed in each incremental charge of the monovinyl-substituted aromatic hydrocarbon monomer is also added. After each incremental charge of monomer and initiator a sufficient time is then allowed to polymerize the newly added monomer to essential completion. Although it is preferred to employ only two charges of monovinyl-substituted aromatic hydrocarbon monomer, more than two additions can be made if desired by dividing the second described monomer charge, i.e., representing 10–60 weight percent, into as many increments as wanted.

At the completion of the multiple additions and subsequent polymerizations of the monovinyl-substituted aromatic hydrocarbon, the conjugated diene monomer, representing from about 30–5 weight percent of the total monomeric material employed in the polymer preparation, is charged to the reaction mixture and is allowed to form a block copolymer with the previously polymerized monovinyl-substituted aromatic hydrocarbon monomer. No additional initiator is added with the diene charge. The conjugated diene is converted to the copolymer by contact with the reactive terminal lithium atoms of the previously prepared living nonelastomeric polymer.

Thus, the first addition of initiator accompanies the first monovinyl-substituted aromatic monomer addition and is added in an amount to provide from about 0.01 to 0.2, preferably 0.03 to 0.10 parts by weight of initiator per 100 parts by weight of monomer. The second addition of initiator is charged in an amount to provide from about 0.1 to 1.5, preferably 0.3 to 1.5, parts by weight of initiator per 100 parts by weight of the monomer then charged. In order to obtain the improved results of the present invention, the proportion of initiator to monomer in all monomer-initiator additions beyond the first should be substantially greater than that of the first addition. Thus, the amount of initiator per 100 parts of monomer in the later additions should exceed that of the first by at least about 0.1 and preferably by at least about 0.2 parts initiator per 100 parts monomer by weight.

The monovinyl-substituted aromatic hydrocarbon monomers, or mixtures thereof, that are employed according to the application contain from about eight to 18 carbon atoms per molecule. Examples of suitable compounds include:
 styrene,
 3-methylstyrene,
 4-n-propylstyrene,
 4-cyclohexylstyrene,
 4-dodecylstyrene,
 2-ethyl-4-benzylstyrene,
 4-p-tolylstyrene,
 4-(4-phenyl-n-butyl)styrene,
 1-vinylnaphthalene,
 2-vinylnaphthalene, and the like.
The monovinyl-substituted aromatic hydrocarbon can contain alkyl, cycloalkyl, and aryl substituents, and combinations thereto such as alkylaryl in which the total number of carbon atoms in the combined substituents is generally not greater than 12. Styrene is presently preferred because of its availability and effectiveness.

Conjugated dienes, and mixtures thereof, that can be employed as monomers according to this invention generally contain from about four to 12 carbon atoms per molecule and those containing from about four to eight carbon atoms are preferred. Exemplary of suitable compounds are:
 1,3-butadiene,
 isoprene,
 2,3-dimethyl-1,3-butadiene,
 piperylene,
 3-butyl-1,3-octadiene,
 phenyl-1,3-butadiene, and the like.
Butadiene-1,3 is particularly effective and presently preferred.

The polymerization initiators employed according to this invention are well known and can be broadly depicted as organolithium initiators. Those preferred are hydrocarbyl monolithium compounds and can be represented by the formula RLi wherein R is a hydrocarbon radical selected from aliphatic, cycloaliphatic, or aromatic radicals containing from about one to 20 carbon atoms per molecule. Exemplary initiators suitable for use according to this invention include:
 n-butyllithium,
 sec-butyllithium,
 methyllithium,
 phenyllithium,
 naphthyllithium,
 p-tolyllithium,
 cyclohexyllithium,
 eicosyllithium, and the like.
Because it is particularly effective, n-butyllithium is presently preferred.

The polymer formed following reaction with the polyfunctional treating agent having at least three functional groups can be broadly characterized as a radial polymer. If a difunctional treating agent is employed to form the branched block copolymers of the application, it must itself be a monomeric material capable of addition to itself under polymerization conditions.

Some polyfunctional treating agents that can be employed according to the application in the preparation of the branched block copolymers are the polyepoxides such as epoxidized linseed oil and 1,2,5,6,9,10-triepoxydecane, polyimines such as tri(1-aziridinyl)phosphine oxide, polyisocyanates such as benzene-1,2,4-triisocyanate, polyaldehydes such as 1,4,7-naphthalene tricarboxyaldehyde, polyhalides such as silicon tetrachloride or polyketones such as 1,4,9,10-anthracenetetrone. The aforementioned treating agents are described in U. S. Pat. No. 3,281,383, issued Oct. 25, 1966 to Zelinski et al. and are hereby incorporated by reference. Tin compounds disclosed in U. S. Pat. No. 3,393,182, issued July 16, 1968, to Trepka are also suitable. Exemplary compounds are tetrallyltin, stannic fluoride, and the like. The polyvinyl aromatic compounds as disclosed in U. S. Pat. No. 3,280,084, issued Oct. 18, 1966, to Zelinski et al. such as divinylbenzene are suitable difunctional treating agents.

The particular polyfunctional treating agent employed in the application is not critical so long as said agent is capable of forming branched polymer by reacting with active terminal lithium atoms of a living polymer provided that said agent does not substantially impair the desired properties of the final polymer. The number of functional groups per molecule of the polyfunctional treating agent employed in the preparation of the branched block copolymer is preferably at least 3. The treating agents such as those disclosed in U. S. Pat. No. 3,280,084, i.e., polyvinyl aromatic compounds which are themselves monomeric materials such as divinylbenzene are suitable for use in this invention in that they provide a branched block copolymer but not necessarily a typical radial polymer.

The polyfunctional treating agent is employed in an amount sufficient to provide from about 0.05 to 2, preferably 0.5 to 1.5, equivalents of said agent per gram atom of lithium employed in the initiator. One functional group of said polyfunctional treating agent, i.e., one equivalent is the optimum amount to be employed per gram atom of lithium. The polyfunctional treating agent is added to the polymerization mixture after the polymerization has been completed and prior to the deactivation of the initiator.

In order to prepare a polymer possessing the hereinbefore described attributes the polymerization is conducted at any temperature suitable for polymerization up to about 250° F., preferably below about 230° F.

The polymerization reaction can be conducted under autogeneous pressure. It is usually desirable to operate at pressures sufficient to maintain the monomeric material substantially in the liquid phase.

Polymerization can be conducted in the presence or absence of diluent. Inert hydrocarbon diluents selected from aromatics, paraffins, or cycloparaffins, and mixtures thereof, containing from about four to 10 carbon atoms per molecule can be suitably employed. The diluent or diluent mixture is one which is liquid under conditions of the polymerization process and exemplary diluents are isobutene, n-pentane, cyclohexane, benzene, toluene, xylene, naphthalene, and the like. As in all such catalytic reactions, the polymerizations are conducted in the substantial absence of air or moisture, preferably in an inert atmosphere.

Small amounts of an ether compound, such as tetrahydrofuran, can also be employed in the polymerization reaction. Amounts of tetrahydrofuran to provide from about 0.005 to 5 weight percent of tetrahydrofuran based on the total monomer charge, preferably 0.05 to 0.1 weight percent, are considered suitable. The tetrahydrofuran appears to reduce the induction period of some of the initiators, such as n-butyllithium, and its presence appears active in improving the clarity of final polymer articles.

The branched block copolymers formed when the polyfunctional treating agent contains at least three functional groups can be broadly depicted as an $(A-B)_xY$ type polymer, wherein A represents the nonelastomeric polymer blocks or segments and B represents the elastomeric polymer segments. Y is an atom or group of atoms derived from the polyfunctional treating agent used in the formation of the radial polymers and $x$ represents the number of functional groups of said polyfunctional treating agent and is an integer of at least 3.

The radial block copolymers produced according to the application using a polyfunctional treating agent having at least three functional groups can thus be characterized as having at least three polymer branches with each branch of the radial block copolymer comprising terminal nonelastomeric segments. The branches of the radial block copolymer thus contain terminal nonelastomeric segments and an elastomeric polymer segment joined thereto.

Regardless of the polymer configuration, the terminal nonelastomeric segments of the polymodal branched block copolymer comprise from about 70 to 95, preferably 75 to 85 weight percent of the total weight of the block copolymer with the elastomeric segments comprising about 30 to 5, preferably about 25 to 15 weight percent of the total weight of the block copolymer based upon the total weight of all the monomers charged.

Subject to the above limitations, the terminal nonelastomeric segments can contain small quantities of polymerized conjugated diene monomer and the elastomeric segment can contain small quantities of polymerized monovinyl-substituted aromatic hydrocarbon such as in a random copolymer.

It is important that each of the polymer segments retain their relative nonelastomeric and elastomeric properties but as long as these small amounts of different monomeric material do not substantially affect their relative properties they can be employed. Generally, the nonelastomeric segments should not contain more than 30 weight percent polymerized conjugated diene nor the elastomeric segment more than 30 weight percent polymerized monovinyl-substituted aromatic hydrocarbon.

The polymers of the application are further characterized as polymodal branched block copolymers. The term polymodal refers to the plurality of modes or peaks in the gel permeation chromatograph curve of the polymers, i.e., the molecular weight distribution curve, when compared to the other known branched polymers such as those described in said U. S. Pat. No. 3,281,383, issued Oct. 25, 1966, Zelinski, which do not show a plurality of modes and have a comparatively narrow molecular weight range.

The polymodal branched block copolymers of the application are characterized in that they possess a melt flow in the range of about 0.5 to 20.0 and generally one from about 1.0 to 5.0 as determined by ASTM D-1238-65T, condition G.

PRODUCTION OF POLYPROPYLENE

In U. S. Pat. No. 3,280,090, issued Oct. 18, 1966, Jack S. Scoggin, there is described and claimed a process which comprises in a continuous propylene mass polymerization process wherein a liquid propylene is contacted in a polymerization zone with a catalyst formed by mixing materials comprising a. a compound having the formula $R_nMX_m$, wherein R is selected from the group consisting of alkyl, cycloalkyl and aryl radicals, X is selected from the group consisting of aluminum, gallium, indium and thallium, $n$ is from 1 to 3, inclusive, $m$ is from 0 to 2, inclusive, and the sum of $m$ and $n$ is equal to the valence of the metal M, and b. a halide of a metal selected from the group consisting of metals of Groups IV-B, V-B, VI-B, and VIII, under polymerization conditions so as to form solid polymer in particle form and wherein an effluent containing said polymer, catalyst residues, and liquid propylene is recovered from said polymerization zone, the improvement which comprises introducing said effluent into a contact zone, mixing said effluent in said contact zone with a diketone selected from the group consisting of compounds having the following formulas:

(1) 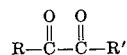

and (2) 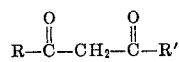

wherein R and R' are hydrocarbon radicals, said mixing occurring under conditions such that said propylene remains in liquid phase; withdrawing the thus treated effluent from said contact zone; introducing said treated effluent into an upper portion of a wash zone;

introducing a wash liquid comprising a low boiling hydrocarbon into a lower portion of said wash zone; contacting said treated effluent with said low boiling hydrocarbon in said wash zone in countercurrent flow under conditions such that said low boiling hydrocarbon and said propylene remain in liquid phase; withdrawing from an upper portion of said wash zone a stream comprising propylene, low boiling hydrocarbon, soluble polymer and catalyst residues; and recovering from a lower portion of said wash zone a stream comprising low boiling hydrocarbon and solid polymer substantially free of catalyst residues at a rate sufficient to main a desired level of polymer solids in said lower portion of said wash zone. In the patent, the entire disclosure of which is incorporated herein by reference, polymers are prepared from propylene as well as other 1-olefins. Catalyst systems and conditions which can be employed are substantially as described herein with reference to preparation of mixed copolymer.

Mixed copolymers produced by the batch process were prepared in a stirred reactor with a capacity of 88.4 gallons. It was also jacketed for temperature control. A batch of polymer was prepared by filling the reactor with propylene, then charging diethylaluminum chloride and titanium trichloride as catalyst and allowing propylene to polymerize at a temperature of 120° F. Upon reaching the desired concentration of about 25 weight percent polypropylene as a slurry of solid polymer particles in liquid propylene, the reactor was cooled to 55° F. with the coolant in the jacket and the desired amount of ethylene added. Polymerization of both propylene and ethylene was then continued at 55° F. until the desired amount of copolymer was produced. The reactor contents were then treated for catalyst and diluent removal as in the continuous process. Additional details for samples 1, 2, 3, 4, 23, and 25 used in the blends reported in Table III are presented in Table II below:

TABLE II.—PRODUCTION OF BATCH MIXED COPOLYMER

| Sample number | Composition of mixed copolymer, weight percent | | | Propylene to reactor, lb. | Ethylene to reactor, lb. | TiCl₃ charged, lb. | DEAC charged, lb. | Density, g./cc. | Tensile yield, p.s.i. | Ultimate elongation, percent | Melt flow at 230° C. g./10 min. |
|---|---|---|---|---|---|---|---|---|---|---|---|
| | Propylene | Ethylene | Copolymer | | | | | | | | |
| 1 | 93.6 | 6.4 | 17.8 | 314 | 21 | 0.109 | 0.13 | 0.901 | 2060 | 125 | 3.9 |
| 2 | 93.1 | 6.9 | 16.2 | 314 | 21 | 0.107 | 0.13 | 0.901 | 3020 | 162 | 2.7 |
| 3 | 88.7 | 11.3 | 20.0 | 297 | 24.5 | 0.079 | 0.13 | 0.901 | 2710 | 120 | 3.5 |
| 4 | 90.2 | 9.8 | 15.7 | 302 | 24.5 | 0.078 | 0.13 | 0.901 | 2830 | 95 | 4.7 |
| 23 | 91.2 | 8.8 | 13.5 | 308 | 21.0 | 0.079 | 0.13 | 0.905 | 3310 | 96 | 5.2 |
| 25 | 90.7 | 9.3 | 18.0 | | | 0.151 | 0.17 | 0.900 | 2930 | 183 | 4.7 |

PREPARATION OF MIXED COPOLYMERS USED

The mixed copolymers used in the blends of the instant invention were prepared by both batch and continuous processes. The continuously prepared mixed copolymer was made in a pilot plant consisting of a 26-gallon, stirred reactor which discharged into a smaller or 10-gallon, stirred reactor. Both reactors were surrounded by jackets through which coolants flowed for temperature control. Propylene was continuously passed to the first reactor to serve as both diluent and polymerization monomer. Diethylaluminum chloride and titanium trichloride were also passed continuously to the first reactor as catalyst. Residence time in the first reactor was three hours and the temperature was maintained at 130° F. thus polymerizing about 25 percent of the propylene to produce a slurry of solid polypropylene particles in propylene diluent. The reactive slurry was passed from the first reactor to the second, smaller reactor where ethylene was added and the polymerization continued until the desired amount of copolymer was produced. Residence time in the second reactor was one hour. The temperature was maintained at 75° F. Effluent from the second reactor was contacted with acetylacetone for solubilization of catalyst residues and then washed with liquid propylene for removal of both soluble catalyst residues and soluble polymer. The washed slurry of polymer particles was flashed for separation of dry mixed copolymer from propylene diluent. Additional details are presented in Table I below for samples 5, 19 and 21 used in the blends reported in Table III:

Preparation of Radial Resin Samples Used in Blends

The radial resins used in samples 6, 8, 9, 13 through 18, 20, 22, 24, and 26 in Table III were prepared batchwise in a 1,000-gallon stirred reactor as follows: the reactor was first charged with 765 gallons of cyclohexane as solvent. The entire charge of 675 pounds of styrene was then added followed by the addition of 1.08 pounds of n-butyllithium catalyst. Styrene polymerization began at a reactor temperature of 120° F. and proceeded adiabatically (no attempt being made to remove heat of reaction) to completion with a rise in reactor temperature to 180° F. This required 20 minutes. At the completion of styrene polymerization as evidenced by a decrease in reaction temperature, a butadiene charge of 225 pounds was added. The butadiene polymerized adiabatically over a period of 15 minutes with reaction temperature increasing to 220° F. Upon completion of butadiene polymerization as evidenced by a decrease in reaction temperature, a charge of 4.5 pounds of polyfunctional treating agent was added. The agent used was a commercial grade of epoxidized linseed oil containing approximately five functional groups per molecule and sold commercially as Epoxyl 9–5 by Swift and Company. Approximately 30 minutes after addition of the polyfunctional treating agent, the solution of radial resin was stabilized by addition of 4.5 pounds of Ionol and 13.50 pounds of Polygard HR. Ionol is a commercial stabilizer sold by Shell Oil and chemically known as 2,6-di-*tert*-butyl-4-methylphenol. Polygard HR is tri(nonylphenyl) phosphite plus 1 percent triisopropanolamine, available

TABLE I.—CONTINUOUS PREPARATION OF MIXED COPOLYMER

| Sample number | Composition of mixed copolymer, weight percent | | | Composition of liquid in 2d reactor, mol percent | | Melt flow at 230° C., g./10 min. | Density, g./cc. | Ultimate elongation, percent | Tensile yield, p.s.i. |
|---|---|---|---|---|---|---|---|---|---|
| | Propylene | Ethylene | Copolymer | Propylene | Ethylene | | | | |
| 5 | 93.2 | 6.8 | 18.3 | 88.2 | 11.8 | 3.4 | 0.905 | 168 | 2,880 |
| 19 | 93.6 | 6.4 | 17 | 88.6 | 11.4 | 3.5 | 0.902 | 127 | 3,090 |
| 21 | 90.75 | 9.25 | 20 | 86.7 | 13.3 | 5.3 | 0.902 | 55 | 2,780 | from Naugatuck Chemical Division of U.S. Rubber Company.

The stabilized solution of radial resin in cyclohexane solvent was passed from the reactor into a steam stripper wherein the solvent was steam stripped leaving a slurry of resin particles in boiling water. The water-resin slurry was dewatered over a screen and the resin particles dried in a conventional Banbury mixer.

The radial resin thus prepared had a butadiene content of 25 weight percent, a styrene content of 75 weight percent, and a melt index of 3 as determined by ASTM D–1238–65T, Condition G.

The polymodal radial resin used in samples 28 through 32 was prepared by multiple addition and polymerization of the styrene portion using the same reactor as previously described for preparing samples of radial resin. Details of the multiple polymerization procedure are as follows:

| First Stage | Charge to Reactor |
|---|---|
| 1. Cyclohexane | 765 gallons |
| 2. Styrene | 450 pounds |
| 3. n-butyllithium | 0.22 pound |
| 4. Reaction Temp., °F. | 120 to 180°F. |
| 5. Time for Completion of Polymerization Reaction | 15 minutes |

Upon completion of the first stage polymerization as indicated by "peaking" of reaction temperature, the second-stage polymerization was initiated as follows:

| Second Stage | Charge to Reactor |
|---|---|
| 1. Styrene | 225 pounds |
| 2. n-butyllithium | 0.86 pound |
| 3. Reaction Temp., °F. | 120 to 180°F. |
| 4. Polymerization Time, min. | 15 |

Upon completion of second-stage polymerization, the third stage was initiated as follows:

| Third Stage | Charge to Reactor |
|---|---|
| Butadiene | 225 pounds |
| Reaction Temp., °F. | 150 to 220°F. |
| Reaction Time | 15 minutes |

| Fourth Stage | Charge to Reactor |
|---|---|
| Epoxyl 9—5 | 4.5 pounds |
| Reaction Time | 30 minutes |

Upon completion of the fourth stage, the reaction mixture was stabilized by addition of 4.5 pounds of Ionol and 13.50 pounds of Polygard HR as for the radial resin. Recovery of the polymodal polymer from solvent was the same as previously described for the radial polymer.

The polymodal radial resin thus prepared had a butadiene content of 25 weight percent, a styrene content of 75 weight percent, a melt flow of 3.9 as determined by ASTM D–1238–65T, Condition G, and a flexural modulus of 253 × 10$^{-3}$ psi.

Preparation Of Polypropylene Used

The propylene homopolymer used in some of the blends was prepared by a continuous process employing a single reactor. Operating conditions were the same as those previously described for the preparation of propylene homopolymer in the first reactor of the two-stage continuous mixed copolymer process. Properties of the propylene homopolymer, in addition to those given in Table III, include a density of 0.905, a melt flow of 5.0 as measured at 230° C., a tensile yield of 4,700 psi, and an ultimate elongation exceeding 100 percent.

As stated the mixed copolymer is made by first polymerizing propylene to form blocks of propylene homopolymer or simply polypropylene. To the reactor containing polypropylene and unreacted propylene is then added ethylene and the polymerization reaction continued. A copolymer of ethylene and propylene is then formed. This copolymer may or may not be attached to the polypropylene molecules. Thus, it appears that a mixture of polypropylene and ethylene-propylene copolymer is or may be present. This material is or may be a type of block polypropylene since there are true blocks of polypropylene present.

Also as noted the mixed copolymer may be made either in a batch process or by a continuous process.

In the batch process, the reactor is filled with a batch or propylene, a catalyst is added to the reactor, about half of the propylene is polymerized to make polypropylene, then a batch of ethylene is added and both ethylene and propylene are polymerized.

The continuous process propylene and catalyst are fed continuously to a first reactor wherein polypropylene is produced. Effluent from the first reactor consisting of a slurry of polypropylene in unreacted propylene is continuously passed to a second reactor to which ethylene is also continuously passed. The ethylene-propylene copolymer is produced in the second reactor in the presence of previously produced polypropylene. The continuous effluent from the second reactor consists of the mixture of the two or the mixed copolymer.

It generally does not matter whether a given polymer is produced batch-wise or continuously insofar as properties of the polymer are concerned. This is not the case for the mixed propylene-ethylene copolymer. Differences are evident in the comparison below.

| | Brittleness Temp., °F. | 72° F. Notched Modulus Ft.-Lb. | 0° F. No Notch Ft.-Lb. | Flexural psi×10$^{-3}$ |
|---|---|---|---|---|
| Batch Mixed Copolymer | −45 | 3.5 | 15.2 | 170 |
| Continuous Mixed Copolymer | −19 | 2.13 | 14.7 | 169 |

The comparison shows the marked differences in brittleness temperature and in 72° F. Izod impact values. For a good high impact polypropylene, the brittleness temperature should be as low as possible and the impact values should be high. The batch mixed copolymer is thus seen to be a much more attractive high impact polypropylene than the continuously prepared mixed copolymer.

According to the present invention a small amount of polymodal resin, as herein defined, is added, sometimes together with some polypropylene to the continuously produced mixed copolymer to make it at least equal in properties, e.g., flexural modulus, to the batch produced mixed copolymer. As desired, the polypropylene can be first blended with the mixed copolymer or with the polymodal resin or after the mixed copolymer and the polymodal resin have been blended. The use of the polypropylene avoids having to operate a batch process. It is known that continuous processes are cheaper to build and operate, lend themselves to automatic controls, more precise control of operating conditions, etc. Thus, the present invention in using the polypropylene presents an improvement of great advantages.

Preparation of Blends

All blends were prepared by adding the proper weights of the two or three component polymers to a 5-pound laboratory-size Banbury mixer. The Banbury was then operated until the mixture of polymers reached the molten state. This usually required about 2 minutes. The heat input required to bring the mixture to the molten state was obtained entirely from the energy input to the mixers in the Banbury. The molten mixture was additionally blended for 5 minutes after reaching the molten state to insure that a homogeneous blend was obtained. The contents of the Banbury was then extruded into pellets and analyzed to obtain the blend data presented in Table III below.

Referring to Table III, samples 1 through 4 and 23 and 25 list typical properties of batch-produced mixed copolymer with variations in ethylene-propylene content of the total polymer and variations in the percentage of copolymer in said total polymer, (i.e., the amount produced during copolymerization of both ethylene and propylene). As brittleness temperature decreases, impact increases. Flexural modulus decreases as copolymer content increases.

Samples 5, 19, and 21 list properties of continuously produced mixed copolymers. The higher brittleness temperatures are to be noted.

Samples 6 and 7 list properties for typical radial and polypropylene resins, respectively. The high brittleness temperatures are noted.

In sample 8, having 5 per cent radial resin added to the mixed copolymer of sample 5 gave a brittleness temperature of −41° F. which is much lower than either component. This is a surprising result.

Izod impact also increased while flexural modulus was not appreciably reduced. Thus, important improvements in brittleness temperature reduction and impact increase have been obtained. In sample 9 a little more polymodal resin additionally lowered brittleness temperature to −51° F.

In samples 10 through 12 polypropylene was added to the mixed copolymer of sample 5. There was obtained an increase in modulus which is sometimes quite desirable. Thus, by blending both radial resin and polypropylene with the mixed copolymer, the brittleness temperature can be lowered without affecting modulus. Samples 13 through 18 show this quite well.

Samples 19–20 and 21–22 show results on addition of radial resin to mixed copolymers of composition slightly different from that of sample 5.

Samples 28 through 32 illustrate the improvement of adding polymodal radial resin to the batch-produced "M" polymer of sample 27. The brittleness temperature is appreciably reduced as when radial resin was added to similar "M" polymer in preceding samples.

TABLE III

| Sample number | Blend ratio by weight, "M"/"X"/"PP" [1] | Method of preparing "M" polymer | Composition of "M" polymer, weight percent | | | Brittleness temp., °F. | IZOD impact | | Flexural modulus, p.s.i.×10⁻³ |
|---|---|---|---|---|---|---|---|---|---|
| | | | Propylene | Ethylene | Propylene-ethylene copolymer | | 72° F. notched, ft.-lb. | 0° F. no notch, ft.-lb. | |
| 1 | 100/0/0 | Batch | 93.6 | 6.4 | 17.8 | −37 | 2.3 | 17.0 | 173 |
| 2 | 100/0/0 | do | 93.1 | 6.9 | 16.2 | −30 | 2.0 | 16.3 | 179 |
| 3 | 100/0/0 | do | 88.7 | 11.3 | 20.0 | −42 | 2.3 | 18.9 | 178 |
| 4 | 100/0/0 | do | 90.2 | 9.8 | 15.7 | −35 | 2.0 | 21.2 | 183 |
| 5 | 100/0/0 | Continuous | 93.2 | 6.8 | 18.3 | −19 | 2.1 | 14.7 | 169 |
| 6 | 0/100/0 | do | | | | >70 | 0.5 | | 187 |
| 7 | 0/0/100 | do | | | | >70 | 0.7 | >20 | 225 |
| 8 | 95/5/0 | do | Used sample 5 above | | | −41 | 2.5 | 21 | 168 |
| 9 | 90/10/0 | do | Used sample 5 above | | | −51 | 2.7 | 28.4 | 168 |
| 10 | 95/0/5 | do | Used sample 5 above | | | −18 | 2.0 | 15.9 | 180 |
| 11 | 90/0/10 | do | Used sample 5 above | | | −8 | 2.0 | 14.5 | 180 |
| 12 | 80/0/20 | do | Used sample 5 above | | | +1 | 1.6 | 15.8 | 193 |
| 13 | 85/10/5 | do | Used sample 5 above | | | −40 | 2.3 | 15.0 | 162 |
| 14 | 80/10/10 | do | Used sample 5 above | | | −44 | 2.1 | 25.5 | 171 |
| 15 | 70/10/20 | do | Used sample 5 above | | | −15 | 1.6 | 19.3 | 184 |
| 16 | 90/5/5 | do | Used sample 5 above | | | −44 | 2.3 | 20.6 | 160 |
| 17 | 85/5/10 | do | Used sample 5 above | | | −22 | 2.1 | 19.6 | 170 |
| 18 | 80/5/15 | do | Used sample 5 above | | | −29 | 1.9 | 17.9 | 168 |
| 19 | 100/0/0 | do | 93.6 | 6.4 | 17.0 | −3 | 1.8 | 12.0 | 189 |
| 20 | 90/10/0 | do | 93.6 | 6.4 | 17.0 | −43 | 2.4 | 22.0 | 179 |
| 21 | 100/0/0 | do | 90.75 | 9.25 | 20.0 | −15 | 1.7 | 18.0 | 176 |
| 22 | 90/10/0 | do | 90.75 | 9.25 | 20.0 | −39 | 2.9 | 23.0 | 158 |
| 23 | 100/0/0 | Batch | 91.2 | 8.8 | 13.5 | +18 | 1.6 | 7.4 | 204 |
| 24 | 90/10/0 | do | 91.2 | 8.8 | 13.5 | −34 | 2.1 | 21.5 | 188 |
| 25 | 100/0/0 | do | 90.7 | 9.3 | 18.0 | −39 | 2.6 | 21.0 | 189 |
| 26 | 90/10/0 | do | 90.7 | 9.3 | 18.0 | −54 | 3.9 | 24.0 | 166 |
| 27 | 100/0/0 | do | 90.7 | 9.3 | 18.0 | −10 | 2.5 | 20.3 | 183 |
| 28 | 90/10/²/0 | do | 90.7 | 9.3 | 18.0 | −31 | 3.8 | 38.5 | 169 |
| 29 | 90/10/²/0 | do | 90.7 | 9.3 | 18.0 | −34 | 3.4 | 28.4 | 173 |
| 30 | 95/5/²/0 | do | 90.7 | 9.3 | 18.0 | −21 | 2.7 | 21.7 | 175 |
| 31 | 90/10/²/0 | do | 90.7 | 9.3 | 18.0 | −34 | 3.3 | 25.0 | 163 |
| 32 | 80/20/²/0 | do | 90.7 | 9.3 | 18.0 | −52 | 3.8 | (³) | 157 |

[1] "M"=Mixed copolymer of propylene and ethylene; "X"=Resinous radial block copolymer made by single addition and polymerization of the styrene; "PP"=Polypropylene.
[2] Polymodal, resinous radial block copolymer made by multiple addition and polymerization of the styrene portion.
[3] No breaks.

Thus, the continuously produced mixed copolymer has been rendered more desirable as a high impact polypropylene by addition of radial or polymodal resin. Addition of polymodal resin to batch-produced mixed copolymer also gave reductions in brittleness temperature and increase in Izod impact and thus improved its usefulness as a high impact polypropylene.

Also according to the present invention, as evident from samples 23 through 26, the addition of a minor amount of radial resin to batch-produced mixed copolymer results not only in a decreased brittleness temperature, indeed, very advantageous decrease in brittleness temperature, but also in a substantially increased Izod impact with clearly acceptable flexural modulus.

Generally, the final blends according to the invention, which can be varied as to composition depending on the properties of the selected components to be blended, will contain at least about 65 weight percent of the mixed copolymer, the remainder being essentially the resinous radial block copolymer and polypropylene of which at least about 2 weight per cent is said resinous radial copolymer.

More specifically, as a now preferred blend range there will be present at least about 70 weight percent of the mixed copolymer, the remainder being the radial resin ingredient and polypropylene with a radial resin ingredient content in the blend of at least about 5 and up to about 10 percent.

When polypropylene is absent, its weight is made up with either or both of the other two ingredients.

Reasonable variation and modification are possible within the scope of the foregoing disclosure and the appended claims to the invention the essence of which is that a minor proportion of a resinous, radial, block copolymer alone, as described, when blended with a mixed propylene-ethylene copolymer in an appreciable amount will materially improve at least one property of the propylene-ethylene copolymer; that is to say, will considerably lower its brittleness temperature, however produced; and, further, when that polypropylene, as described, is also admixed there is improvement in the flexural modulus of the erstwhile two-component admixture.

I claim:

1. An improved low brittleness temperature, high impact resistance blend of polymers consisting essentially of a mixed propylene-ethylene block copolymer containing at least 75 weight percent of polypropylene, said mixed propylene-ethylene copolymer being produced in a two-step process yielding a solid in which in one-step propylene is homopolymerized and in the other step ethylene is copolymerized with propylene, blended together with a minor proportion of a solid, resinous, radial block copolymer prepared by treatment of a resinous block polymer comprising from about 70 to 95 weight percent polymerized monovinyl-substituted aromatic hydrocarbon monomer containing from about eight to 18 carbon atoms per molecule and from about 30 to 5 weight percent polymerized conjugated diene monomer containing from about four to 12 carbon atoms per molecule; said polymer having a melt flow in the range of about 0.5 to 20.0 as determined by ASTM D-1238-65T, condition G with a polyfunctional treating agent to add branches to said resinous polymer, thus forming therewith said radial block copolymer, sufficient to appreciably improve the low brittleness and Izod impact strength properties of said mixed copolymer.

2. A composition according to claim 1 containing also a minor proportion of solid polypropylene based on said mixed copolymer whereby said properties are further improved.

3. A composition according to claim 1 wherein the mixed propylene-ethylene block copolymer is produced by a two-step polymerization process comprising a step in which propylene as the sole monomer is polymerized in the presence of liquid propylene in the absence of additional liquid diluent at a temperature within the range of 80° to 150° F. and a step in which ethylene is polymerized in the presence of liquid propylene in the absence of additional liquid diluent at a temperature within the range of —50° to 75° F., the step which is carried out second being performed in the presence of the polymer produced in the first, using a catalyst formed by mixing materials comprising a. a compound having the formula $R_nMX_m$, wherein R is selected from the group consisting of alkyl, cycloalkyl, and aryl radicals, X is selected from the group consisting of hydrogen and a halogen, M is selected from the group consisting of aluminum, gallium, indium, and thallium, n is from 1 to 3, inclusive, m is from 0 to 2, inclusive, and the sum of m and n is equal to the the valence of the metal M, and b. a halide of a metal selected from the group consisting of metals of Groups IV–A, IV–B, V–B, VI–B, and VIII and the resinous, radial block copolymer is produced by a. contacting under polymerization conditions at a temperature up to about 250° F. a monovinyl-substituted aromatic hydrocarbon monomer containing from about eight to 18 carbon atoms per molecule with an organolithium polymerization initiator containing from about one to 20 carbon atoms per molecule wherein said monovinyl-substituted aromatic hydrocarbon monomer is employed in an amount to provide from about 40 to 100 weight percent of the total monovinyl-substituted aromatic hydrocarbon employed in preparing said copolymer wherein said initiator is employed in an amount to provide from about 0.01 to 0.2 parts by weight of initiator per 100 parts by weight of said monomer and continuing said contacting for a period of time sufficient to polymerize essentially all of said monovinyl-substituted aromatic hydrocarbon monomer;

b. charging to the polymerization reaction product of step (a), in one or more increments, any remaining monovinyl-substituted aromatic hydrocarbon monomer representing from about 0 to 60 weight percent of said total monovinyl-substituted aromatic hydrocarbon monomer employed in preparing said copolymer, wherein for each incremental charge of monovinyl-substituted aromatic hydrocarbon monomer additional said organolithium initiator is provided in an amount from about 0.1 to 1.5 parts by weight of said initiator per 100 parts by weight of said incremental charge of monomer, wherein after each monomer and initiator charged a sufficient contacting time is allowed to permit essential complete polymerization of the newly added monomer, wherein the amount of initiator employed per 100 parts by weight of each incremental monomer charge of step (b) exceeds the amount of initiator employed in step (a) by at least 0.1 part of initiator per 100 parts of monomer by weight and wherein the total amount of said monovinyl-substituted aromatic hydrocarbon monomer employed in steps (a) and (b) comprises from about 70 to 95 weight percent of the total weight of said branched block copolymer based upon the total weight of all of the monomer employed;

c. charging, to the polymerization reaction product of steps (a) and (b), a conjugated diene monomer containing from about four to 12 carbon atoms per molecule and polymerizing to essential completion said diene monomer in the presence of said reaction product to form a block copolymer, and wherein the amount of said diene monomer comprises from about 30 to 5 weight percent of the total weight of said branched block copolymer based upon the total weight of all of the monomers employed; and d. charging to the polymerization reaction product of step (c) a polyfunctional treating agent capable of reacting with terminal lithium atoms on a preformed polymer to form a branched polymer wherein said polyfunctional treating agent is employed in an amount to provide from about 0.05 to 2 equivalents of said polyfunctional treating agent per gram atom of lithium employed in said polymerization process.

4. A composition according to claim 1 wherein the mixed propylene-ethylene block copolymer is produced by polymerizing ethylene in the presence of liquid propylene in the absence of additional liquid diluent at a temperature within the range of $-50°$ to $75°$ F., using a catalyst formed by mixing materials comprising a. a compound having the formula $R_nMX_m$, wherein R is selected from the group consisting of alkyl, cycloalkyl and aryl radicals, X is selected from the group consisting of hydrogen and a halogen, M is selected from the group consisting of aluminum, gallium, indium and thallium, $n$ is from 1 to 3, inclusive, $m$ is from 0 to 2, inclusive, and the sum of $m$ and $n$ is equal to the valence of the metal M, and b. a halide of a metal selected from the group consisting of metal of Groups IV-A, IV-B, V-B, VI-B and VIII removing unpolymerized ethylene from the reaction mixture, and polymerizing in the presence of liquid propylene at least a portion of the remaining propylene at a temperature within the range of $80°$ to $150°$ F. in the presence of the polymer produced in the first step and said resinous, radial block copolymer is produced by a. contacting, under polymerization conditions at a temperature up to about $250°$ F., a monovinyl-substituted aromatic hydrocarbon monomer, containing from about eight to 18 carbon atoms per molecule, with an organolithium polymerization initiator containing from about one to 20 carbon atoms per molecule, wherein said monovinyl-substituted aromatic hydrocarbon monomer is employed in an amount to provide from about 40 to 90 weight percent of the total monovinyl-substituted aromatic hydrocarbon employed in preparing said copolymer, wherein said initiator is employed in an amount to provide from about 0.01 to 0.2 parts by weight of initiator per 100 parts by weight of said monomer and continuing said contacting for a period of time sufficient to polymerize essentially all of said monovinyl-substituted aromatic hydrocarbon monomer;

b. charging to the polymerization reaction product of step (a), in one or more increments, the remaining monovinyl-substituted aromatic hydrocarbon monomer representing from about 10 to 60 weight percent of said total monovinyl-substituted aromatic hydrocarbon monomer employed in preparing said copolymer, wherein for each incremental charge of monovinyl-substituted aromatic hydrocarbon monomer additional said organolithium initiator is provided in an amount from about 0.1 to 1.5 parts by weight of said initiator per 100 parts by weight of said incremental charge of monomer, wherein after each monomer and initiator charged a sufficient contacting time is allowed to permit essential complete polymerization of the newly added monomer, wherein the amount of initiator employed per 100 parts by weight of each incremental monomer charge of step (b) exceeds the amount of initiator employed in step (a) by at least 0.1 part of initiator per 100 parts of monomer by weight and wherein the total amount of said monovinyl-substituted aromatic hydrocarbon monomer employed in steps (a) and (b) comprises from about 70 to 95 weight percent of the total weight of said branched block copolymer based upon the total weight of all of the monomers employed;

c. charging to the polymerization reaction product of step (b) a conjugated diene monomer containing from about four to 12 carbon atoms per molecule and polymerizing to essential completion said diene monomer in the presence of said reaction product to form a block copolymer, and wherein the amount of said diene monomer comprises from about 30 to 5 weight percent of the total weight of said branched block copolymer based upon the total weight of all of the monomers employed; and d. charging to the polymerization reaction product of step (c) a polyfunctional treating agent capable of reacting with terminal lithium atoms on a preformed polymer to form a branched polymer wherein said polyfunctional treating agent is employed in an amount to provide from about 0.05 to 2 equivalents of said polyfunctional treating agent per gram atom of lithium employed in said polymerization process.

5. A method for improving the low brittleness temperature and impact resistance properties of a mixed propylene-ethylene block copolymer containing at least 75 weight percent of polypropylene, said mixed propylene-ethylene copolymer being produced in a two-step process yielding a solid in which in one-step propylene is homopolymerized and in the other step ethylene is copolymerized with propylene, which comprises blending it together with an amount of a solid polymodal, resinous, branched block copolymer prepared by treatment of a resinous block polymer comprising from about 70 to 95 weight percent polymerized monovinyl-substituted aromatic hydrocarbon monomer containing from about 8 to 18 carbon atoms per molecule and from about 30 to 5 weight percent polymerized conjugated diene monomer containing from about four to 12 carbon atoms per molecule; said polymer having a melt flow in the range of about 0.5 to 20.0 as determined by ASTM D–1238–65T, condition G with a polyfunctional treating agent to add branches to said resinous polymer, thus forming therewith said radial block copolymer, effective to appreciably improve at least one one of its properties such as Izod impact or brittleness temperature.

6. A method according to claim 5 wherein the mixed propylene-ethylene block copolymer contains at least about 75 weight percent of propylene obtained by homopolymerization and from about 10 to about 25 percent of propylene-ethylene copolymer obtained by copolymerization of an ethylene-propylene mixture, the total mixed copolymer containing from about 5 to about 15 weight percent ethylene and the remainder being propylene and wherein the polymodal, resinous, branched block copolymer contains from about 70 to 95 weight percent polymerized monovinyl-substituted aromatic hydrocarbon monomer containing from about eight to 18 carbon atoms per molecule and from about 30 to 5 weight percent polymerized conjugated diene monomer containing from about four to 12 carbon atoms per molecule, said polymodal, resinous, branched block copolymer being formed by first forming segments by multiple additions of monovinyl-substituted aromatic hydrocarbon monomer and initiator, subsequently adding conjugated diene to form polymer and then adding a polyfunctional treating agent.

7. A composition according to claim 2 wherein the mixed propylene-ethylene block copolymer results from a continuous production thereof.

8. A composition according to claim 1 wherein the blend contains at least about 65 percent of the mixed copolymer, the remainder being at least the resinous, radial block copolymer present in a minimum of at least 2 percent.

9. A composition according to claim 1 wherein the blend contains at least about 70 weight percent of the mixed copolymer, the remainder being composed of the resinous, radial block copolymer and polypropylene and the radial ingredient is present in a content of about 5 to about 10 percent.

10. A composition according to claim 8 wherein the radial copolymer is polymodal.

11. A composition according to claim 1 wherein the radial copolymer is polymodal.

* * * * *